(12) United States Patent
Luo

(10) Patent No.: US 12,535,006 B1
(45) Date of Patent: Jan. 27, 2026

(54) SELF-STABILIZING TURBINE AND STEAM-DRIVEN TURBINE ASSEMBLY USING THE SAME

(71) Applicants: BIG SUN ENERGY TECHNOLOGY INC., Hsinchu County (TW); Chia Ching Luo, Hsinchu County (TW)

(72) Inventor: Chia Ching Luo, Hsinchu County (TW)

(73) Assignees: BIG SUN ENERGY TECHNOLOGY INC., Hsinchu County (TW); Chia Ching Luo, Hsinchu County (TW)

( * ) Notice: Subject to any disclaimer, the term of this patent is extended or adjusted under 35 U.S.C. 154(b) by 0 days.

(21) Appl. No.: 18/952,609

(22) Filed: Nov. 19, 2024

(30) Foreign Application Priority Data

Nov. 20, 2023 (TW) ................................. 112144684

(51) Int. Cl.
*F01D 5/14* (2006.01)

(52) U.S. Cl.
CPC ........ *F01D 5/141* (2013.01); *F05D 2250/712* (2013.01); *F05D 2250/75* (2013.01)

(58) Field of Classification Search
CPC . F01D 5/141; F05D 2250/712; F05D 2250/75
See application file for complete search history.

(56) References Cited

U.S. PATENT DOCUMENTS

| 7,147,433 B2* | 12/2006 | Ghizawi | ................. | F01D 5/141 |
| | | | | 416/185 |
| 10,400,614 B2* | 9/2019 | Burdgick | ............. | F01D 5/3007 |
| 10,480,343 B1* | 11/2019 | Zorzi | ........................ | F01D 1/32 |
| 2003/0005696 A1* | 1/2003 | Wilson | .................. | F01K 23/065 |
| | | | | 60/618 |

(Continued)

FOREIGN PATENT DOCUMENTS

| CN | 101871415 A | * 10/2010 |
| CN | 203022832 U | 6/2013 |

(Continued)

OTHER PUBLICATIONS

Li et al (CN 113813811) with English Translation (Year: 2021).*

(Continued)

*Primary Examiner* — Brian Christopher Delrue
(74) *Attorney, Agent, or Firm* — MUNCY, GEISSLER, OLDS & LOWE, P.C.

(57) ABSTRACT

A self-stabilizing turbine includes a housing, a rotating shaft and an impeller. The housing has an inlet and an outlet. The rotating shaft is rotatably mounted to the housing. The impeller is disposed in the housing and has a hub and multiple blades disposed on the hub, and the hub is mounted to the rotating shaft. In a front view of each of the blades, each of the blades has a concave forward structure having a free end having a concave outward notch, and each of the concave forward structure and the concave outward notch is symmetrical with respect to a central radial plane of the impeller. A steam entering the inlet symmetrically pushes the concave forward structure, and flows out of the outlet through the concave outward notch, so that the impeller stably rotates with respect to the central radial plane. A steam-driven turbine assembly using the self-stabilizing turbine is also disclosed.

14 Claims, 8 Drawing Sheets

(56) References Cited

U.S. PATENT DOCUMENTS

| | | | | |
|---|---|---|---|---|
| 2004/0016234 A1* | 1/2004 | Chomiak | ............... | F02B 39/085 |
| | | | | 123/25 P |
| 2005/0106013 A1* | 5/2005 | Ghizawi | ................. | F01D 5/141 |
| | | | | 415/204 |
| 2005/0204723 A1* | 9/2005 | Ouwerkerk | ............. | F01K 23/10 |
| | | | | 60/39.182 |
| 2011/0173991 A1* | 7/2011 | Dean | ......................... | F01D 1/32 |
| | | | | 60/801 |
| 2015/0044021 A1* | 2/2015 | Muller | ....................... | F01K 7/04 |
| | | | | 415/68 |
| 2015/0110617 A1* | 4/2015 | Stein | ........................ | F01D 5/141 |
| | | | | 416/223 R |

FOREIGN PATENT DOCUMENTS

| | | | | |
|---|---|---|---|---|
| CN | 111022242 A | | 4/2020 | |
| CN | 113813811 A | * | 12/2021 | ............ C12M 27/02 |

OTHER PUBLICATIONS

Huang (CN 101871415) with English Translation (Year: 2010).*
Office Action of TW Application No. 112144683 dated Mar. 7, 2025 and English translation, 9 pages.
Office Action of TW Application No. 112144684 dated Feb. 27, 2025 and English translation, 12 pages.

* cited by examiner

SELF-STABILIZING TURBINE AND STEAM-DRIVEN TURBINE ASSEMBLY USING THE SAME

CROSS-REFERENCE TO RELATED APPLICATIONS

This application claims priority of No. 112144684 filed in Taiwan R.O.C. on Nov. 20, 2023 under 35 USC 119, the entire content of which is hereby incorporated by reference.

FIELD OF THE INVENTION

This disclosure relates to a self-stabilizing turbine and a steam-driven turbine assembly using the same, and more particularly to a self-stabilizing turbine, which uses an impeller having blades each having a concave forward structure and a concave outward notch and can be self-stabilized, and a steam-driven turbine assembly using the same.

DESCRIPTION OF RELATED ART

A steam turbine converts the kinetic energy of the steam into the kinetic energy of rotating a turbine, significantly increases the thermal efficiency to be closer to the ideal reversible process in thermodynamics, and can provide the higher power. The steam turbine is particularly suitable for the thermal power generation and the nuclear power generation. The conventional steam turbine uses an axial flow impeller to capture the kinetic energy of the steam, and needs to design blades of the impeller in a complicated manner so that the steam turbine can be manufactured. So, the steam turbine has the huge size and the high manufacturing cost, and is not suitable for middle and small power generating occasions. In addition, when one of the blades is damaged, the blade needs to be replaced with a new one after disassembling the large-size steam turbine, so the maintenance is not easy.

In addition, because the axial flow impeller is used, the steam turbine requires thrust bearings to withstand the strong axial thrust. Compared with the radial bearing, the thrust bearing has many drawbacks, such as the complicated structure, the high price and the large size.

SUMMARY OF THE INVENTION

It is therefore an objective of this disclosure to provide a self-stabilizing turbine and a steam-driven turbine assembly using the same, wherein an impeller having blades each having a concave forward structure and a concave outward notch is used to achieve the self-stabilizing turbine that can be self-stabilized, and applied to a steam turbine and a generator, so that advantages of the simple structure suitable for middle and small power generating occasions can be obtained.

To achieve the above-identified objective, this disclosure provides a self-stabilizing turbine including a housing, a rotating shaft and an impeller. The housing has an inlet and an outlet. The rotating shaft is rotatably mounted to the housing. The impeller is disposed in the housing and has a hub mounted to the rotating shaft, and multiple blades disposed on the hub. In a front view of each of the blades, each of the blades has a concave forward structure having a free end having a concave outward notch, wherein each of the concave forward structure and the concave outward notch is symmetrical with respect to a central radial plane of the impeller, and a steam entering the inlet symmetrically pushes the concave forward structure, and flows out of the outlet through the concave outward notch, so that the impeller stably rotates with respect to the central radial plane.

With the above-mentioned embodiments, it is possible to manufacture the self-stabilizing turbine, which has the moderate size and reasonable price, can be easily maintained, and can drive the generator to generate the electric power when being applied to the steam turbine.

In order to make the above-mentioned content of this disclosure more obvious and be easily understood, preferred embodiments will be described in detail as follows in conjunction with the accompanying drawings.

DETAILED DESCRIPTION OF THE INVENTION

Figure 1:
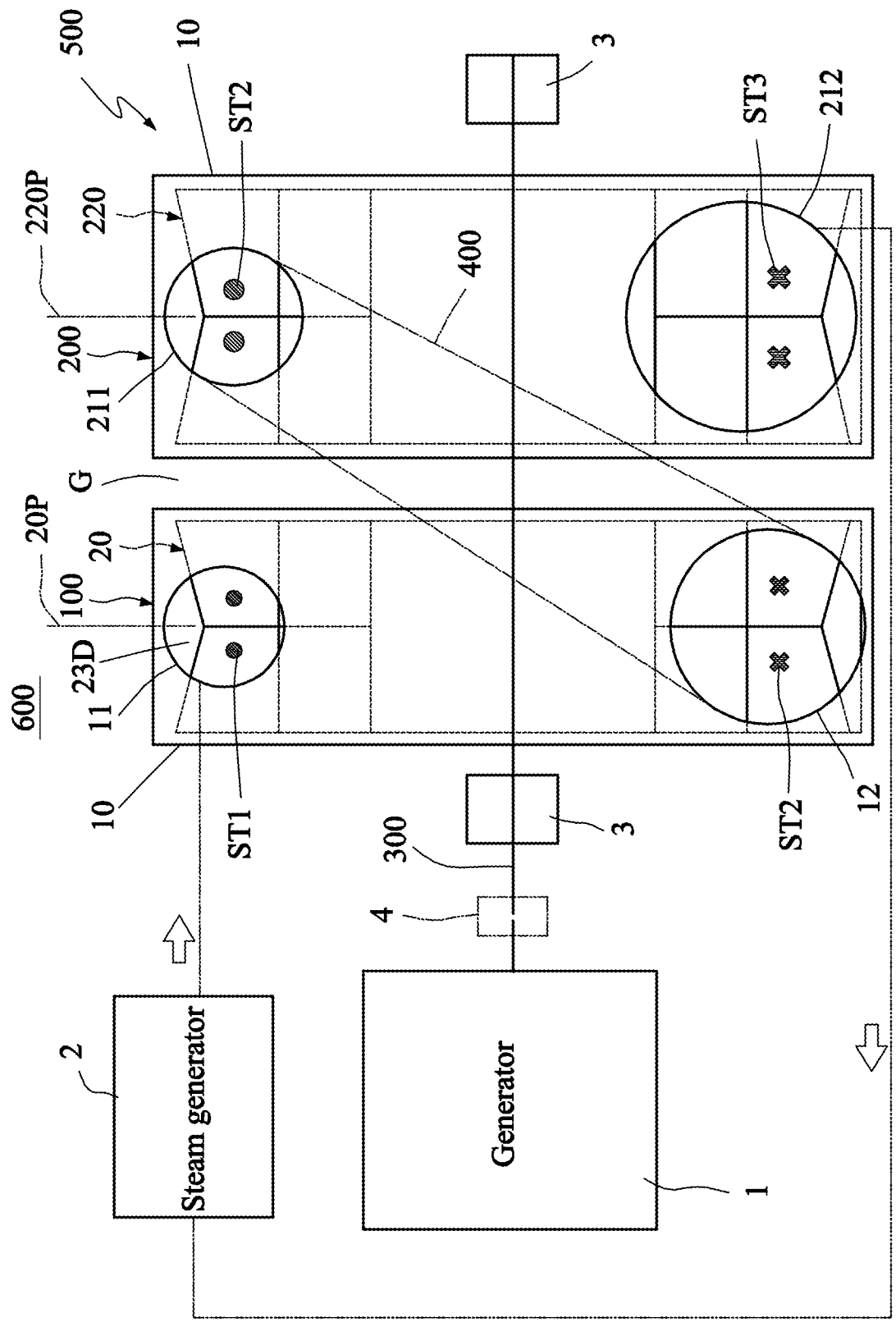
FIG. 1 is a schematic view showing a power generator according to a preferred embodiment of this disclosure.
Figure 2:
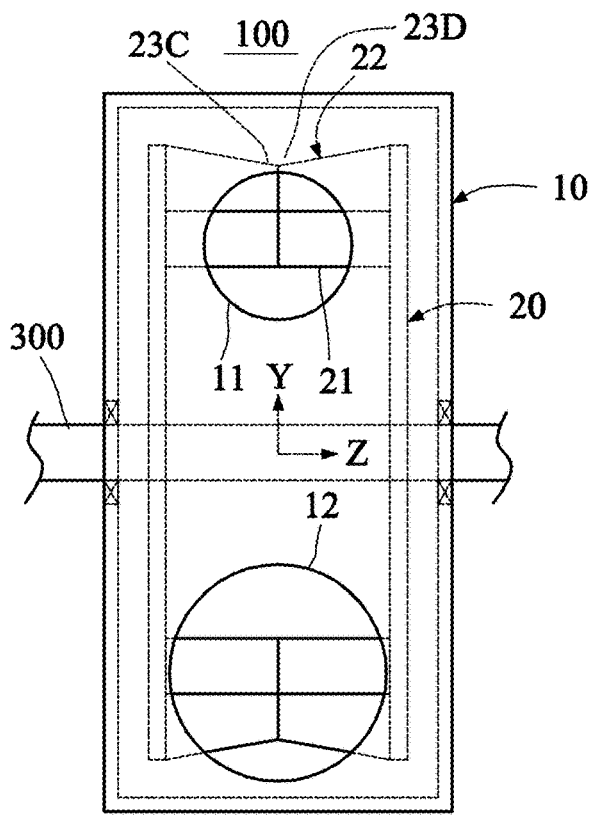
FIG. 2 is a schematic front view showing a first turbine of FIG. 1.
Figure 3:
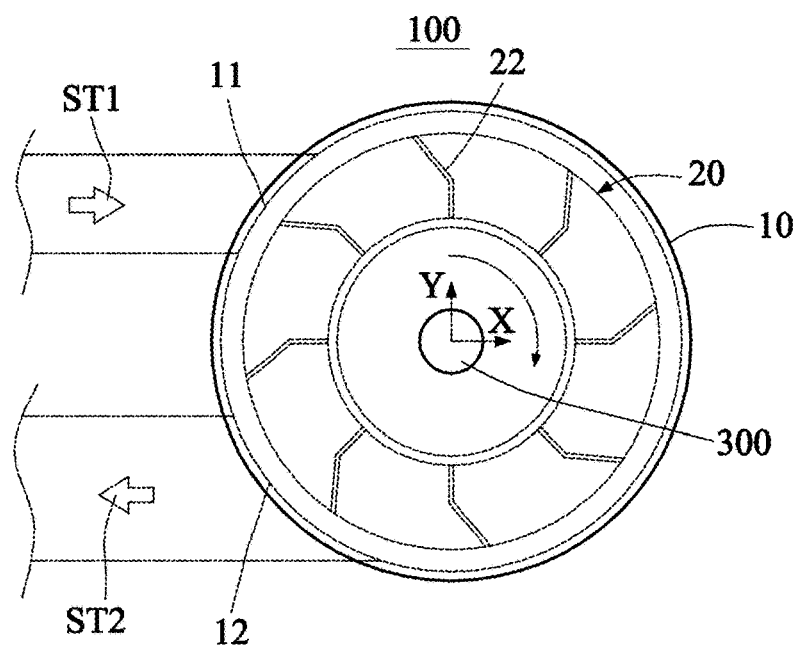
FIG. 3 is a schematic side view showing the first turbine of FIG. 1.
Figure 4:
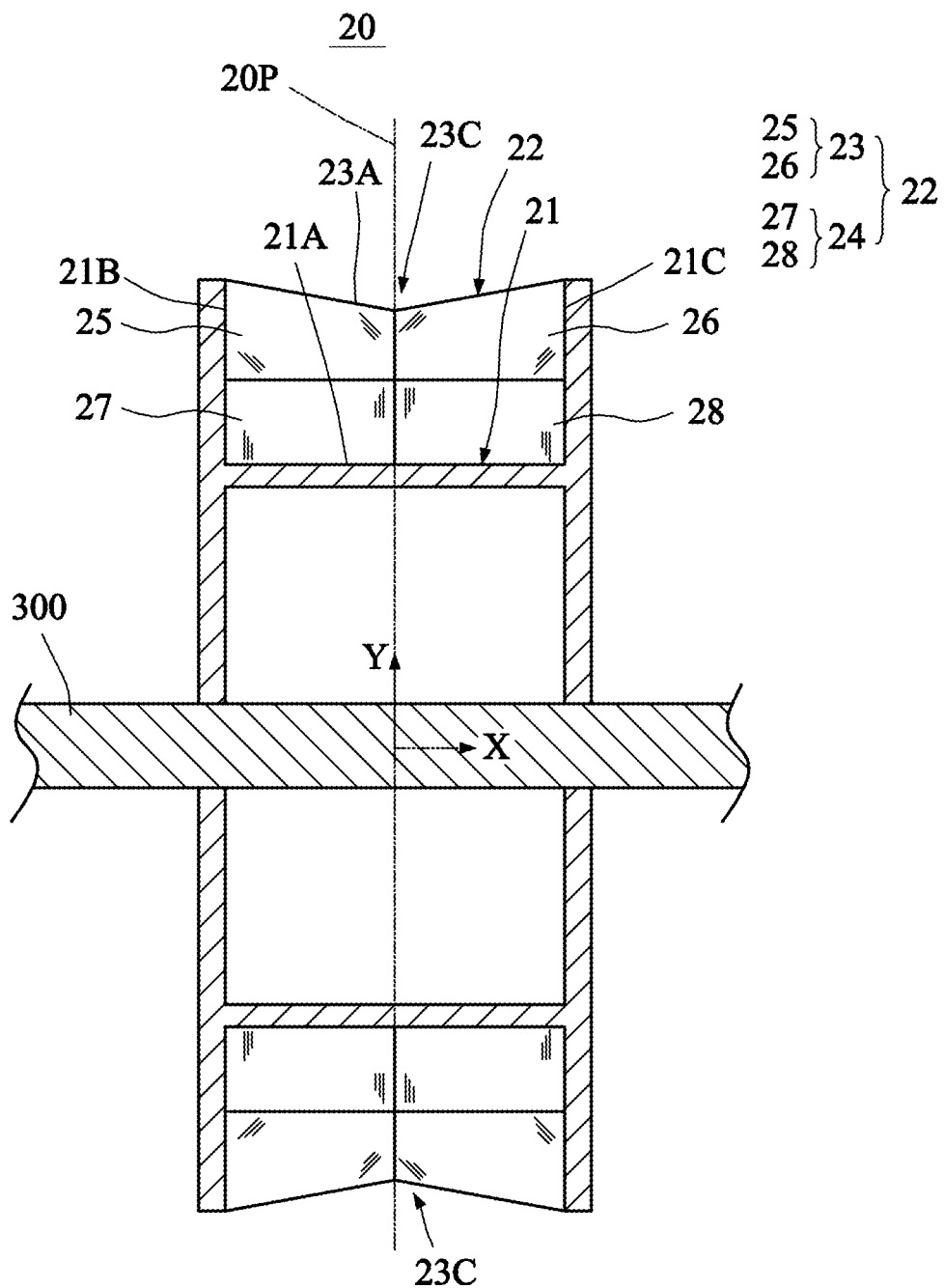
FIG. 4 is a schematically partial cross-sectional view showing the first turbine of FIG. 2.

FIG. 1 is a schematic view showing a power generator 600 according to a preferred embodiment of this disclosure. FIG. 2 is a schematic front view showing a first turbine of FIG. 1. FIG. 3 is a schematic side view showing the first turbine of FIG. 1. FIG. 4 is a schematically partial cross-sectional view showing the first turbine of FIG. 2. Referring to FIGS. 1 to 4, the power generator 600 includes a generator 1, a steam generator 2, multiple bearings 3 and a steam-driven turbine assembly 500 with cascaded impellers. The steam-driven turbine assembly 500 is mounted through the bearings 3, the steam generator 2 generates a steam for driving the steam-driven turbine assembly 500, and the steam-driven turbine assembly 500 drives the generator 1 to generate electric power. The bearing 3 may be an ordinary radial bearing or electromagnetic bearing.

In this embodiment, the steam-driven turbine assembly 500 includes a first turbine 100, a second turbine 200 and a steam conduit 400. The first turbine 100 and the second turbine 200 are coaxially mounted on a rotating shaft 300. The rotating shaft 300 may be connected to the generator 1 through a coupler 4. It is understandable that the rotating shaft 300 may also include multiple shafts and one or multiple couplers combined together and will be explained later. The steam conduit 400 has a conical structure or a tapered structure with multiple sections, so that the steam can be compressed and then enter the second turbine 200. The first turbine 100 and the second turbine 200 have similar structures, so only the first turbine 100 will be explained as an example in the following description.

The first turbine 100 has a first inlet 11 and a first outlet 12. A housing 10 of the second turbine 200 has a second inlet 211 and a second outlet 212. An aperture of the first outlet 12 is larger than an aperture of the first inlet 11. An aperture of the second inlet 211 is smaller than an aperture of the second outlet 212 and larger than the aperture of the first inlet 11. The aperture of the second outlet 212 is larger than the aperture of the first outlet 12.

The steam conduit 400 connects the first outlet 12 to the second inlet 211. A first steam ST1 generated by the steam generator 2 enters the first inlet 11 to push a first impeller 20 of the first turbine 100 to rotate, and is outputted from the first outlet 12 as a second steam ST2. The second steam ST2 enters the second inlet 211 through the steam conduit 400 to push a second impeller 220 of the second turbine 200 to rotate, and is outputted from the second outlet 212 as a third steam ST3. The third steam ST3 can flow back to the steam generator 2 and re-heated into the first steam ST1 to achieve circulation. Thus, the kinetic energy of the steam works in conjunction with the moment of inertia of each of the first impeller 20 and the second impeller 220 to convert the kinetic energy of the steam into the mechanical energy in a multi-stage manner, so that the kinetic energy of the steam can be extracted in an optimized manner. The mechanical energy drives the generator 1 to generate the electric power without generating the huge axial thrust. So, no thrust bearing needs to be used as the bearing 3.

In this embodiment, an axial width of the first impeller 20 is smaller than an axial width of the second impeller 220. Thus, the first steam ST1 with the high kinetic energy and the second steam ST2 with the medium kinetic energy can work in conjunction with each other to drive the narrower first impeller 20 and the wider second impeller 220 to rotate coaxially. In addition, an outer diameter of the first impeller 20 is equal to an outer diameter of the second impeller 220, so that the first turbine 100 and the second turbine 200 may have the same outer diameter and be manufactured into standard components so that the full use of space can be made in terms of inventory. In addition, the steam-driven turbine assembly with the cascaded impellers may further have a third turbine or other turbines connected to the first and second turbines in series, so that the rear-stage turbine can generate the mechanical energy from the front-stage steam. However, the invention is not restricted thereto. The above-mentioned configuration makes the steam-driven turbine assembly 500 have the advantages of the moderate size and the reasonable price.

Figure 5:
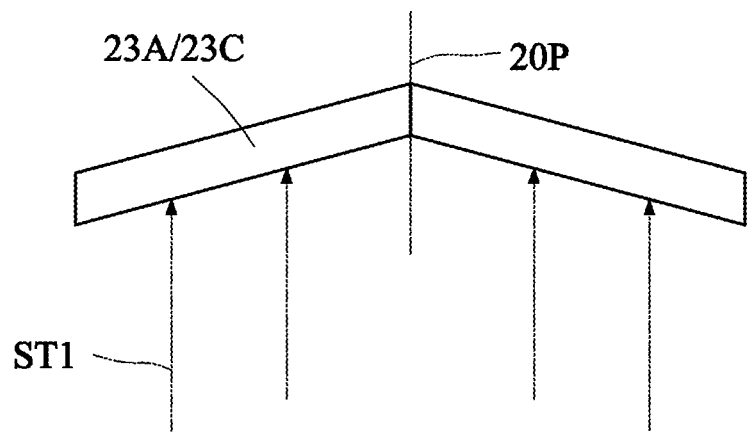
FIG. 5 is a schematic top view showing a concave forward structure of FIG. 4.
Figure 6:
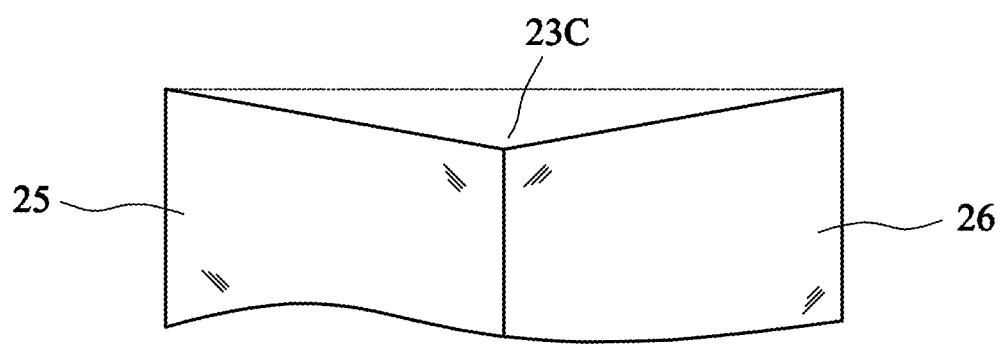
FIG. 6 is a schematic front view showing the concave forward structure of FIG. 4.
Figure 7:
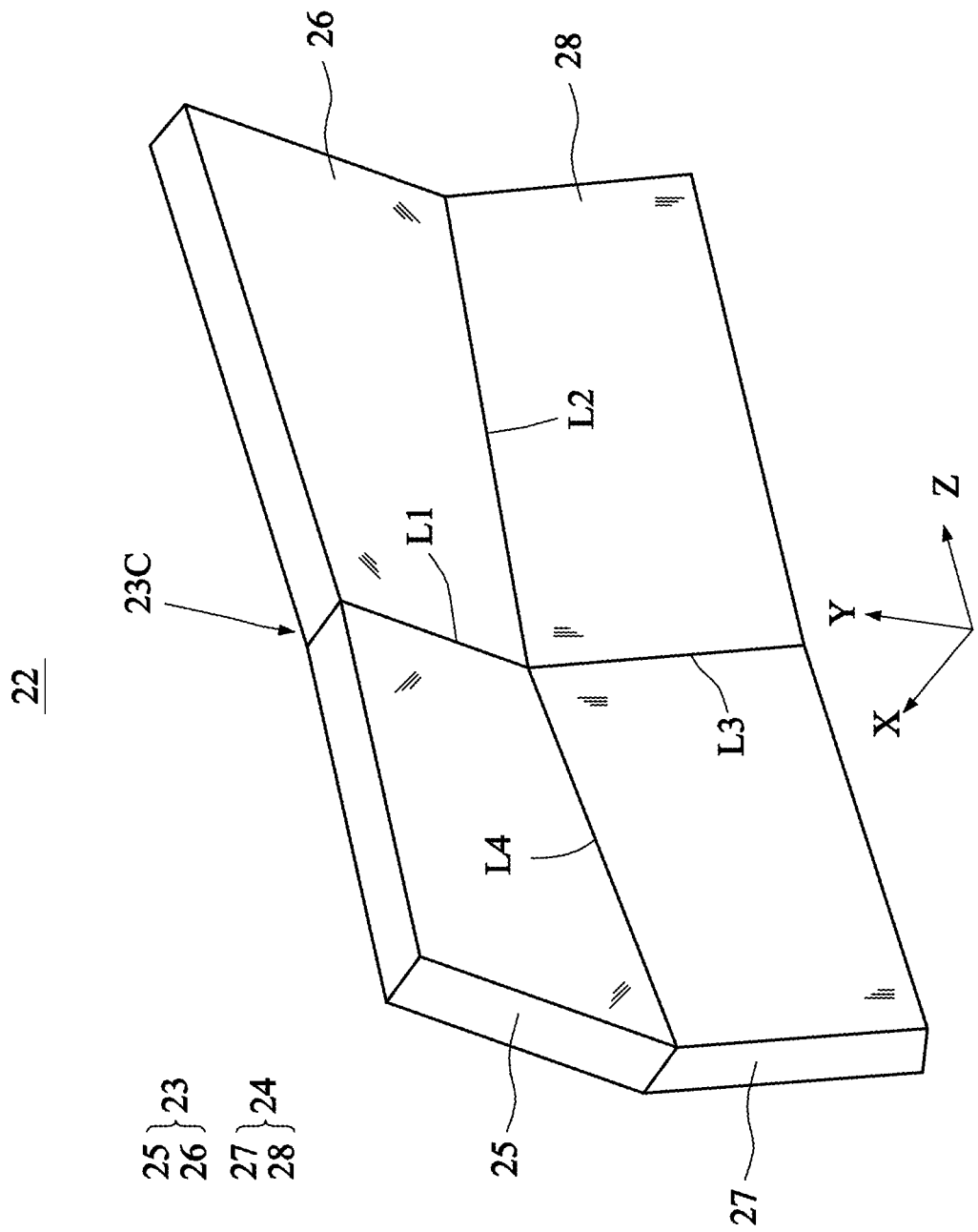
FIG. 7 is a pictorial view showing a blade of FIG. 4.
Figure 8:
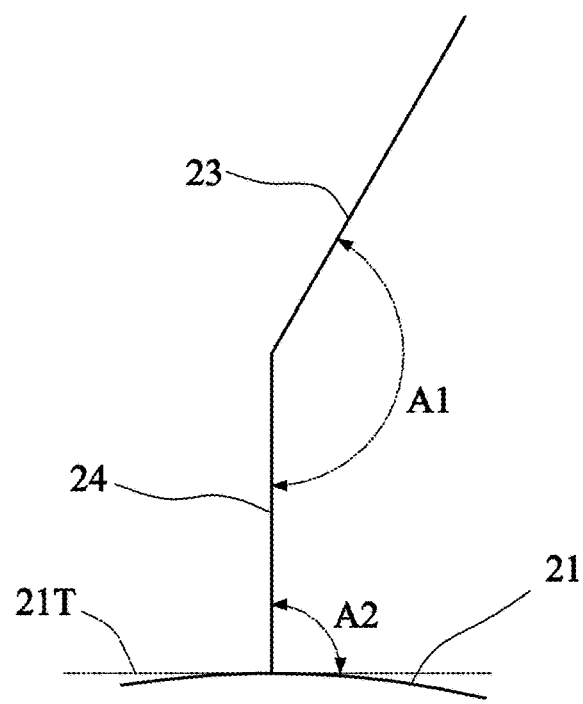
FIG. 8 is a schematic side view showing the blade of FIG. 4.

FIG. 5 is a schematic top view showing a concave forward structure of FIG. 4. FIG. 6 is a schematic front view showing the concave forward structure of FIG. 4. FIG. 7 is a pictorial view showing a blade of FIG. 4. FIG. 8 is a schematic side view showing the blade of FIG. 4. Referring to FIGS. 2 to 8, the first turbine 100 includes the housing 10, the rotating shaft 300 and the first impeller 20. The housing 10 has the first inlet 11 and the first outlet 12. The rotating shaft 300 is rotatably mounted to the housing 10. The first impeller 20 is disposed in the housing 10, and has a hub 21 mounted to the rotating shaft 300, and multiple blades 22 disposed on the hub 21. The housing 10 of the first turbine 100 is separated from the housing 10 of the second turbine 200 by a gap G, and the steam conduit 400 spans (crosses over) the gap G.

In addition, in a front view of each of the blades 22 (when viewing from an upstream position to a downstream position of the first steam ST1, wherein the upstream position (direction) represents a front position (direction)), each of the blades 22 has a concave forward structure 23. A free end 23A of the concave forward structure 23 has a concave outward notch 23C, and each of the concave forward structure 23 and the concave outward notch 23C is symmetrical with respect to a central radial plane 20P of the first impeller 20, so that the kinetic energy of the steam impinging on two sides of the blade 22 can offset each other, and is almost converted into the rotational kinetic energy of the first impeller 20. The central radial plane 20P is an XY plane in an orthogonal XYZ coordinate system having coordinate axes X, Y, and Z. The concave forward structure 23 represents the structure being concave toward a negative X direction, and the concave outward notch 23C represents the notch being concave in a positive Y direction. Thus, the first steam ST1 entering the first inlet 11 in a positive X direction symmetrically pushes the concave forward structure 23, and flows out of the first outlet 12 through the concave outward notch 23C. A space 23D (see also FIG. 2), which is symmetrically passed by the XY plane, is provided between the concave outward notch 23C, which is symmetrically passed by the XY plane, and the housing 10 to allow the first steam ST1, coming from the first inlet 11 and impacting (or impinging on) the concave forward structure 23 in the positive X direction, to expand and pass through in the positive X direction, and also allows the steam, which is about to leave the concave forward structure 23, to expand, pass through and flow out of the first outlet 12 (that is, to let the second steam ST2 escape from the concave outward notch 23C). That is, multiple spaces 23D are provided between the housing 10 of the first turbine 100 and multiple free ends 23A of the multiple blades 22 of the first impeller 20 to allow the first steam ST1 to expand and pass through while the first impeller 20 is rotating. Thus, the first impeller 20 can stably rotate with respect to the central radial plane 20P without the axial offset force, so no axial deflection is present and no axial force is generated. Therefore, the central radial plane 20P symmetrically passes through the spaces 23D, the first inlet 11 and the first outlet 12, so that the first turbine 100 and the second turbine 200 can provide the self stabilizing function, and may also be referred to as self-stabilizing turbines. In addition, the central radial plane 20P and a central radial plane 220P of the second impeller 220 also pass through the steam conduit 400.

In this embodiment, the concave forward structure 23 is a V-shaped structure, and the concave outward notch 23C is a V-shaped notch. This structure can be easily manufactured, and the precision and accuracy thereof can be easily controlled. Although the V-shaped structure is used as an example, it is understandable that the V-shaped bottom part may be an arc shape or a chamfered structure. In addition, each of the blades 22 further has a second concave forward structure 24 connecting the hub 21 to the concave forward structure 23. In a side view (FIG. 8) of the blade 22, an included angle A1 between the second concave forward structure 24 and the concave forward structure 23 is smaller than 180 degrees. Thus, a concave steam capturing surface can be provided to effectively capture the kinetic energy of the steam. In addition, the second concave forward structure 24 is perpendicular to a connection tangent 21T of the hub 21 (an included angle A2 between the second concave forward structure 24 and the connection tangent 21T is equal to 90 degrees), so that the second concave forward structure 24 extends in the radial direction. In addition, as shown in FIG. 4, two sides of the concave forward structure 23 and two sides of the second concave forward structure 24 are mounted on two side walls 21B and 21C of the hub 21. Thus, the structural strength of the blade 22 can be strengthened, and the stability of the first impeller 20 can be enhanced.

Referring to FIG. 7, the concave forward structure 23 has an upper left section 25 and an upper right section 26. The second concave forward structure 24 has a lower left section 27 and a lower right section 28 connected to a circumferential surface 21A of the hub 21, the lower left section 27 is connected to the upper left section 25, and the lower right section 28 is connected to the upper right section 26. The upper left section 25, the upper right section 26, the lower left section 27 and the lower right section 28 constitute a quadrangular pyramid. Regarding four connection lines L1, L2, L3 and L4 between the upper left section 25, the upper right section 26, the lower left section 27 and the lower right section 28, first points of the connection lines L1, L2, L3 and L4 are located at the same position, and second points of the connection lines L1, L2, L3 and L4 are connected through other straight lines to constitute edges of the quadrangular pyramid. Thus, the blade 22 may be formed by way of stamping or pouring using a quadrangular pyramid mold.

Figure 9:
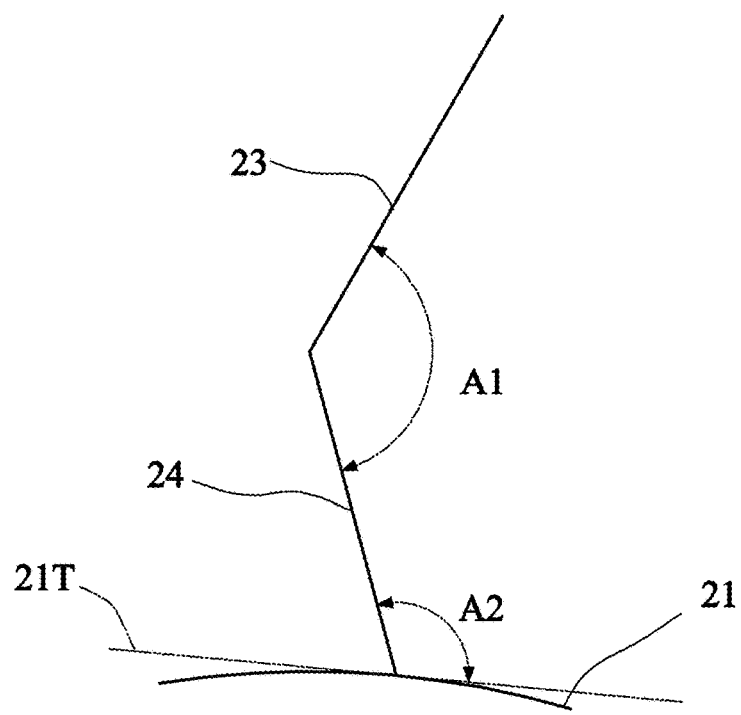
FIG. 9 is a schematic side view showing another example of the blade of FIG. 4.

FIG. 9 is a schematic side view showing another example of the blade of FIG. 4. Referring to FIG. 9, the second concave forward structure 24 is not perpendicular to the connection tangent 21T of the hub 21. Thus, a more effective steam capturing space can be provided to capture the kinetic energy of the steam more effectively.

Figure 10:
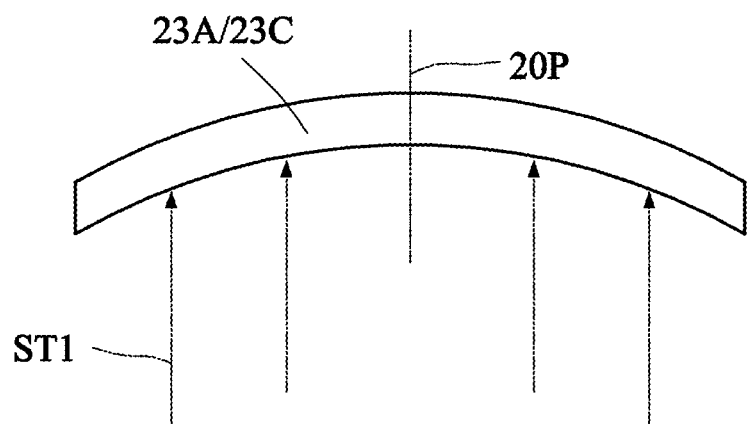
FIG. 10 is a schematic top view showing another example of the concave forward structure of FIG. 5.
Figure 11:
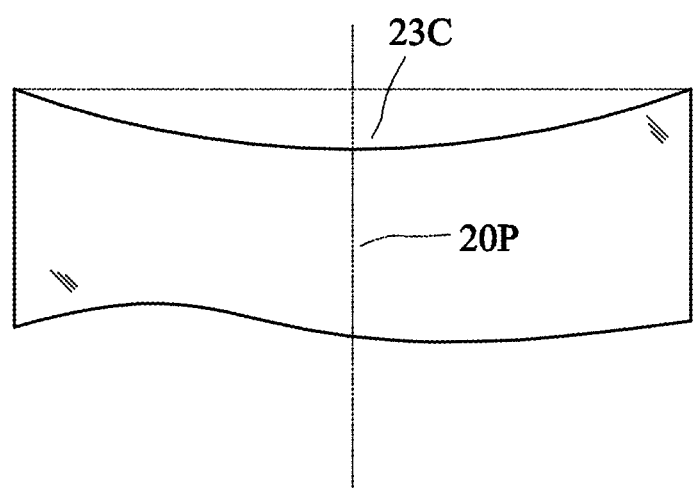
FIG. 11 is a schematic front view showing another example of the concave forward structure of FIG. 6.

FIG. 10 is a schematic top view showing another example of the concave forward structure of FIG. 5. FIG. 11 is a schematic front view showing another example of the concave forward structure of FIG. 6. Referring to FIGS. 10 and 11, the concave forward structure 23 is an arced structure, and the concave outward notch 23C is an arced notch. Thus, a curved surface body mold having a curved surface can be used to form the blade 22 by way of stamping or pouring, and the blade 22 may further have the structure satisfying fluid mechanics and being adapted to the steam streamline.

Figure 12:
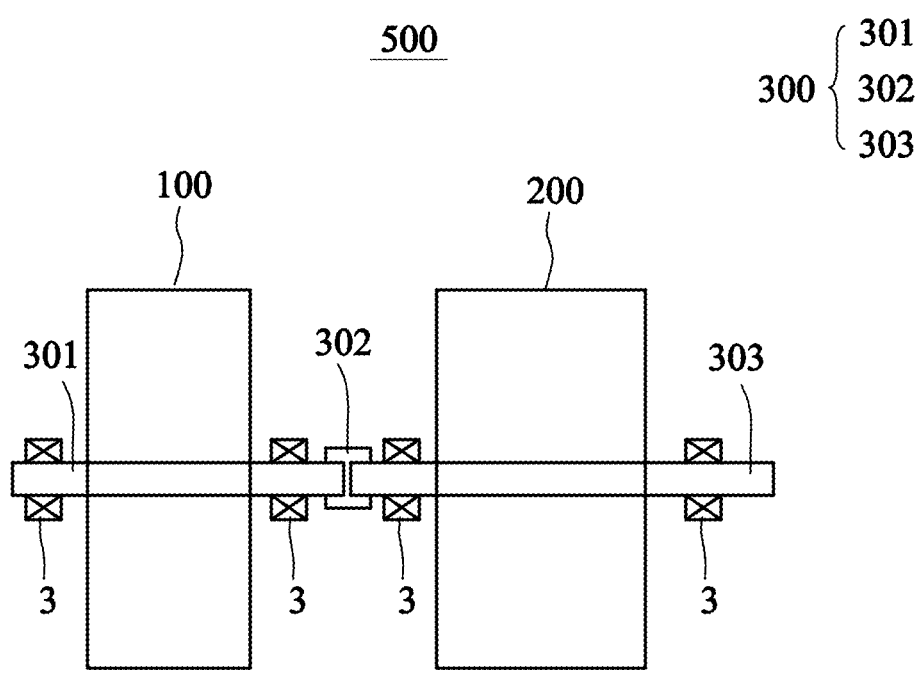
FIG. 12 is a schematic view showing another example of the steam-driven turbine assembly with cascaded impellers of FIG. 1.

FIG. 12 is a schematic view another example of the steam-driven turbine assembly with the cascaded impellers of FIG. 1. Referring to FIG. 12, the rotating shaft 300 includes a first shaft 301, a coupler 302 and a second shaft 303. The first turbine 100 has the first shaft 301, and the second turbine 200 has the second shaft 303. The second shaft 303 is connected to the first shaft 301 through the coupler 302, and the first turbine 100 and the second turbine 200 may be mass-produced as standard components. When one of the components fails, the failed component can be rapidly replaced with a new one to keep the proper rate of the power generator and facilitate the maintenance.

With the self-stabilizing turbine and the steam-driven turbine assembly using the same according to the above-mentioned embodiments, it is possible to manufacture the self-stabilizing turbine, which has the moderate size and reasonable price, can be easily maintained, and can drive the generator to generate the electric power when being applied to the steam turbine.

The specific embodiments proposed in the detailed description of this disclosure are only used to facilitate the description of the technical contents of this disclosure, and do not narrowly limit this disclosure to the above-mentioned embodiments. Various changes of implementations made without departing from the spirit of this disclosure and the scope of the claims are deemed as falling within the following claims.

The invention claimed is:

1. A self-stabilizing turbine, comprising:
a housing having an inlet and an outlet;
a rotating shaft rotatably mounted to the housing; and
an impeller being disposed in the housing, and having a hub mounted to the rotating shaft, and multiple blades disposed on the hub, wherein: in a front view of each of the blades, each of the blades has a concave forward structure having a free end having a concave outward notch, each of the concave forward structure and the concave outward notch is symmetrical with respect to a central radial plane of the impeller, a steam entering the inlet symmetrically pushes the concave forward structure, and a space between the concave outward notch and the housing is provided to allow the steam, coming from the inlet and impacting the concave forward structure, to expand and pass through, and also allows the steam, which is about to leave the concave forward structure, to expand, pass through and flow out of the outlet, so that the impeller stably rotates with respect to the central radial plane, wherein each of the blades further has a second concave forward structure connecting the hub to the concave forward structure, wherein in a side view of the blade, an included angle between the second concave forward structure and the concave forward structure is smaller than 180 degrees, wherein two sides of the concave forward structure and two sides of the second concave forward structure are mounted on two side walls of the hub.

2. The self-stabilizing turbine according to claim 1, wherein the concave forward structure is a V-shaped structure, and the concave outward notch is a V-shaped notch.

3. The self-stabilizing turbine according to claim 1, wherein the second concave forward structure is not perpendicular to a connection tangent of the hub.

4. The self-stabilizing turbine according to claim 1, wherein the second concave forward structure is perpendicular to a connection tangent of the hub.

5. The self-stabilizing turbine according to claim 1, wherein:
the concave forward structure has an upper left section and an upper right section; and
the second concave forward structure has a lower left section and a lower right section connected to a circumferential surface of the hub, the lower left section is connected to the upper left section, and the lower right section is connected to the upper right section.

6. The self-stabilizing turbine according to claim 5, wherein the upper left section, the upper right section, the lower left section and the lower right section constitute a quadrangular pyramid.

7. The self-stabilizing turbine according to claim 1, wherein the concave outward notch is an arced notch.

8. The self-stabilizing turbine according to claim 1, wherein an aperture of the outlet is larger than an aperture of the inlet.

9. A steam-driven turbine assembly, comprising:
the self-stabilizing turbine according to claim 1 being defined as a first turbine;
a second turbine, wherein the first turbine and the second turbine are coaxially mounted to the rotating shaft, wherein the inlet and the outlet of the housing of the first turbine are respectively defined as a first inlet and a first outlet, the impeller of the first turbine is defined as a first impeller, and an aperture of the first outlet is larger than an aperture of the first inlet; the second turbine has a second inlet and a second outlet, an aperture of the second inlet is smaller than an aperture of the second outlet, and larger than the aperture of the first inlet, and the aperture of the second outlet is larger than the aperture of the first outlet; and a steam conduit connecting the first outlet to the second inlet, wherein a first steam enters the first inlet to push the first impeller of the first turbine to rotate, and is outputted from the first outlet as a second steam, and the second steam enters the second inlet through the steam conduit to push a second impeller of the second turbine to rotate and is outputted from the second outlet as a third steam.

10. The steam-driven turbine assembly according to claim 9, wherein an axial width of the first impeller is smaller than an axial width of the second impeller.

11. The steam-driven turbine assembly according to claim 10, wherein an outer diameter of the first impeller is equal to an outer diameter of the second impeller.

12. The steam-driven turbine assembly according to claim 9, wherein a housing of the second turbine has the second inlet and the second outlet, the housing of the first turbine is separated from the housing of the second turbine by a gap, and the steam conduit spans the gap.

13. The steam-driven turbine assembly according to claim 9, wherein the central radial plane of the first impeller symmetrically passes through the space, the first inlet and the first outlet, and the central radial plane of the first impeller and a central radial plane of the second impeller also pass through the steam conduit.

14. The self-stabilizing turbine according to claim 1, wherein the central radial plane is an XY plane in an orthogonal XYZ coordinate system having coordinate axes X, Y, and Z, the concave forward structure represents a structure being concave toward a negative X direction, and the concave outward notch represents a notch being concave in a positive Y direction, the steam entering the inlet in a positive X direction symmetrically pushes the concave forward structure, and the space, which is symmetrically passed by the XY plane, between the concave outward notch, which is symmetrically passed by the XY plane, and the housing is provided to allow the steam, coming from the inlet and impacting the concave forward structure in the positive X direction, to expand and pass through in the positive X direction.

* * * * *